Dec. 26, 1922.
G. GORMAN.
PLATE LIFTER.
FILED OCT. 17, 1919.
1,439,885.
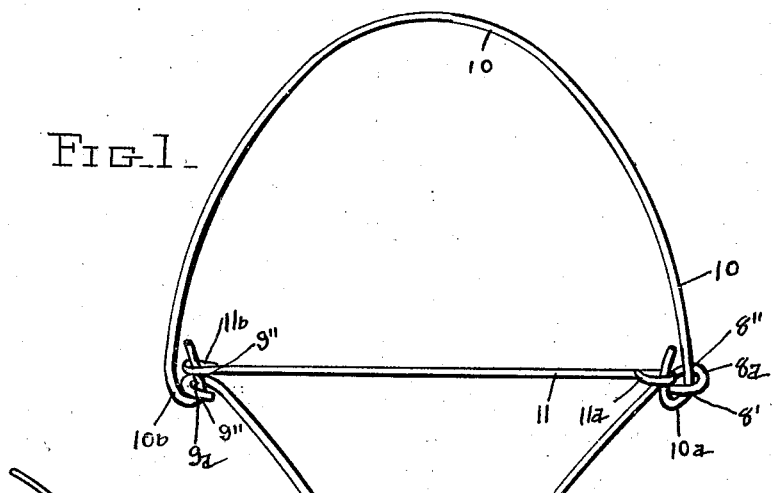
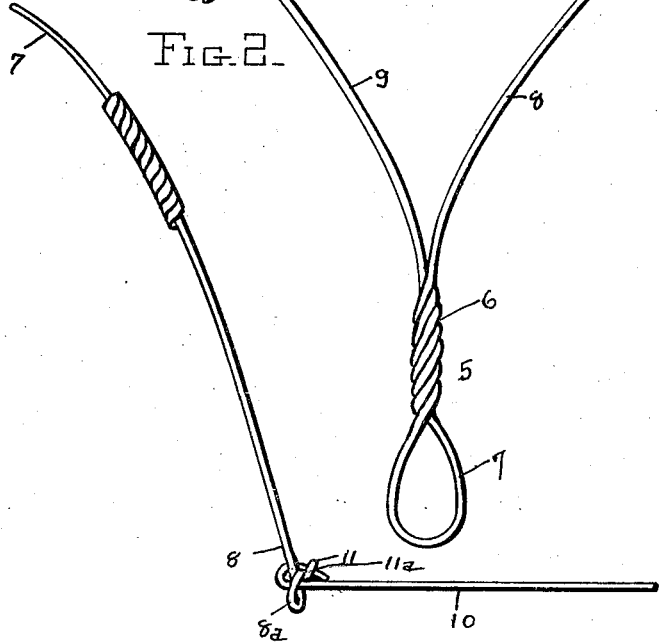
INVENTOR
GEORGE GORMAN
By Joseph J. O'Brien
ATTORNEY Patented Dec. 26, 1922.

1,439,885

UNITED STATES PATENT OFFICE.

GEORGE GORMAN, OF SPRINGFIELD, MASSACHUSETTS.

PLATE LIFTER.

Application filed October 17, 1919. Serial No. 331,453.

*To all whom it may concern:*

Be it known that GEORGE GORMAN, a citizen of the United States of America, residing at Springfield, in the county of Hampden and State of Massachusetts, has invented certain new and useful Improvements in Plate Lifters, of which the following is a specification.

This invention relates to improvements in lifters for pans, plates and the like and its leading object is to provide a simple lifter, preferably constructed of wire and providing a handle and a plate or pan engaging blade portion in the form of a loop to provide a pocket in which the base of the pan or plate may slide so as to prevent accidental displacement from the blade.

Another object of the invention is to provide a device of this character in which the blade can be folded on the handle in its inoperative position and will only have a limited movement in its open position, so that it will be held at an angular relation to the handle, whereby it can be easily pushed under a pan or plate, in an oven on a table or otherwise.

With the above and other objects in view this invention relates to certain new and useful improvements, constructions and arrangements of parts, clearly described in the following specification and fully illustrated in the accompanying drawings, in which:

Fig. 1 is a plan view.

Fig. 2 is a side elevation.

Referring to the accompanying drawings 5 designates a handle which is shown to consist of a single section of wire twisted on itself at 6 so as to provide a terminal closed loop 7 and diverging fork arms 8 and 9. The fork arm 8 is formed with a terminal eye $8^a$ and the fork arm 9 is formed with a similar eye $9^a$.

A lifting blade in the form of a wire loop 10 has its terminal portion connected by the eyes $10^a$ and $10^b$ with the eyes $8^a$ and $9^a$ of the fork arms 8 and 9, the connection between the loops being such that the blade 10 will be held against opening movement by reason of the two point engagement of the eye $10^a$ with the eye $8^a$, at $8'$ and $8''$ and the two point engagement of the eye $10^b$ with the eye $9^a$ at $9'$ and $9''$. In this way the blade has a double stop against excessive opening action on the handle and yet has a limited closing action such as will bring the blade in contacting position with the handle as shown in Figure 3.

In using my improved device the blade occupies the position shown in Fig. 2 and the upper end of the handle is grasped as will be readily understood. The round base of the ordinary plate or pan such as pie plates or of pudding dishes will slide in the open space of the loop 10. In order to limit the inward movement of said plates or pans or dishes and to prevent the spreading apart of the sides of the loop or blade 10 I provide a brace 11 on the ends of which terminal eyes $11^a$ and $11^b$ are formed, which are connected to the terminal eyes $10^a$ and $10^b$ of the blade 10.

Having described my invention, I claim:

A lifter consisting of a loop providing a pocket for the plate to be lifted and having terminal eyes, a brace having terminal eyes connected with the terminal eyes of the loop and providing a stop for engagement by the plate or pan to be lifted and a handle having terminal fork arms hingedly connected with the eyes of the loop and adapted to be held in open position in angular relation thereto and capable of being folded against the loop in its inoperative position.

Signed by me at Springfield, Massachusetts.

GEORGE GORMAN.